(12) United States Patent
Wu et al.

(10) Patent No.: US 12,150,574 B2
(45) Date of Patent: Nov. 26, 2024

(54) KNIFE RACK

(71) Applicant: DOTS TECHNOLOGY INC., New Taipei (TW)

(72) Inventors: Race Wu, New Taipei (TW); Po-Chun Chuang, Taichung (TW); Po-Yu Chen, Taichung (TW)

(73) Assignee: DOTS TECHNOLOGY INC., New Taipei (TW)

( * ) Notice: Subject to any disclaimer, the term of this patent is extended or adjusted under 35 U.S.C. 154(b) by 0 days.

(21) Appl. No.: 18/509,931

(22) Filed: Nov. 15, 2023

(65) Prior Publication Data

US 2024/0268586 A1 Aug. 15, 2024

(30) Foreign Application Priority Data

Feb. 10, 2023 (TW) .................................. 112201170

(51) Int. Cl.
| | |
|---|---|
| *A47G 21/14* | (2006.01) |
| *A47F 7/00* | (2006.01) |
| *A47J 47/16* | (2006.01) |
| *A47B 81/00* | (2006.01) |
| *A47B 81/04* | (2006.01) |

(52) U.S. Cl.
CPC ............ *A47G 21/14* (2013.01); *A47F 7/0021* (2013.01); *A47J 47/16* (2013.01); *A47B 81/005* (2013.01); *A47B 81/04* (2013.01)

(58) Field of Classification Search
CPC ...... A63B 47/00; A63B 47/001; A47G 21/14; A47F 5/01; A47F 2001/103; A47F 7/0028; A47F 7/0021; A47B 77/14; A47B 81/00; A47B 81/005; A47B 81/04; A47J 47/16; A47K 1/09
See application file for complete search history.

(56) References Cited

U.S. PATENT DOCUMENTS

| | | | | |
|---|---|---|---|---|
| 294,200 | A * | 2/1884 | Collender | A63D 15/005 |
| | | | | 473/41 |
| 547,771 | A * | 10/1895 | Cross | A63F 7/044 |
| | | | | 273/113 |
| 926,852 | A * | 7/1909 | Catlin | A47G 21/14 |
| | | | | 248/37.3 |
| 1,050,706 | A * | 1/1913 | Taylor | F24F 3/1411 |
| | | | | 206/315.9 |

(Continued)

FOREIGN PATENT DOCUMENTS

JP 10-234497 A 9/1998

*Primary Examiner* — Devin K Barnett
(74) *Attorney, Agent, or Firm* — Birch, Stewart, Kolasch & Birch, LLP

(57) ABSTRACT

A knife rack includes a box body having a bottom, a plurality of peripheral walls surrounding the bottom, an accommodating space surrounded by the peripheral walls and the bottom and an opening provided where the accommodating space communicates with the outside, a top cover covering the opening and provided with a plurality of long slotted holes, and a plurality of round balls set within the accommodating space of the box body and used as a support structure for supporting knifes. The point-like contact between the round balls and the blades of stored knives can greatly reduce the contact area between the round balls and the blades, and the gaps between the round balls are conducive to air circulation.

11 Claims, 5 Drawing Sheets

(56) References Cited

U.S. PATENT DOCUMENTS

| | | | | |
|---|---|---|---|---|
| 1,063,910 A * | 6/1913 | Borkheim | A63F 3/00031 |
| | | | 273/244.1 |
| 1,342,733 A * | 6/1920 | Austin | 211/14 |
| 1,840,439 A * | 1/1932 | James | B65D 83/00 |
| | | | 206/315.9 |
| 2,272,340 A * | 2/1942 | Walter | A63B 47/005 |
| | | | 126/263.05 |
| 2,575,149 A * | 11/1951 | Watson | A47J 43/24 |
| | | | 99/623 |
| 2,756,901 A * | 7/1956 | Cowsert | A47F 1/08 |
| | | | 221/311 |
| 2,967,714 A * | 1/1961 | Rosario | A63F 3/00094 |
| | | | 273/281 |
| 3,533,547 A * | 10/1970 | Houston | B65D 5/22 |
| | | | 229/172 |
| 3,819,040 A * | 6/1974 | Coons | B65D 41/0442 |
| | | | 206/315.9 |
| 4,011,954 A * | 3/1977 | Galli | A47F 5/108 |
| | | | 211/188 |
| 4,142,665 A * | 3/1979 | Jewell | B65D 5/443 |
| | | | 229/193 |
| 4,192,561 A * | 3/1980 | Gunn | B65D 25/02 |
| | | | 206/397 |
| 4,267,928 A * | 5/1981 | Curry, Jr. | B65D 83/0055 |
| | | | 206/583 |
| 4,303,188 A * | 12/1981 | Calabrese | A45C 5/00 |
| | | | 224/904 |
| D271,171 S * | 11/1983 | Kinkade | D7/637 |
| 4,461,504 A * | 7/1984 | Perez | A63B 47/02 |
| | | | 294/19.2 |
| D283,868 S * | 5/1986 | Kelly | D7/640 |
| 4,642,934 A * | 2/1987 | Carlson | A01K 63/02 |
| | | | 220/495.08 |
| 4,671,406 A * | 6/1987 | Baer | B65D 81/2053 |
| | | | 220/717 |
| 4,969,750 A * | 11/1990 | Russo | B65D 85/84 |
| | | | 206/524.4 |
| D321,280 S * | 11/1991 | D'Angeli | D21/713 |
| 5,086,948 A * | 2/1992 | Slusarz | A63B 47/001 |
| | | | 473/460 |
| 5,433,491 A * | 7/1995 | Green | A63B 47/02 |
| | | | 206/315.9 |
| D368,556 S * | 4/1996 | Rodgers | D30/106 |
| 5,553,707 A * | 9/1996 | Lion | A45F 5/00 |
| | | | 224/678 |
| 5,695,312 A * | 12/1997 | Kelly | A63B 57/20 |
| | | | 206/315.9 |
| 5,715,947 A * | 2/1998 | Gonzales | A47F 7/0007 |
| | | | 211/14 |
| 5,730,286 A * | 3/1998 | Eska | A63B 39/025 |
| | | | 206/315.9 |
| 5,775,518 A * | 7/1998 | Connor | A47G 21/14 |
| | | | 248/37.3 |
| 5,813,548 A * | 9/1998 | Jiang | A47F 7/0071 |
| | | | 211/113 |
| 5,833,336 A * | 11/1998 | Dean | D06F 95/002 |
| | | | 312/351 |
| 5,848,690 A * | 12/1998 | Granger | B65D 51/1677 |
| | | | 206/315.9 |
| 5,850,784 A * | 12/1998 | Conner | A47J 47/005 |
| | | | 248/37.3 |
| 6,029,850 A * | 2/2000 | Pate | A63B 47/00 |
| | | | 206/315.9 |
| 6,079,108 A * | 6/2000 | Lin | A47G 21/14 |
| | | | 248/37.3 |
| 6,082,559 A * | 7/2000 | Levsen | B65D 25/10 |
| | | | 248/37.3 |
| 6,267,461 B1 * | 7/2001 | Dunagan | A63B 47/002 |
| | | | 312/49 |
| 6,352,153 B1 * | 3/2002 | Ohashi | B65D 51/26 |
| | | | 206/814 |
| 6,398,040 B1 * | 6/2002 | Gregory | A63B 47/00 |
| | | | 211/113 |
| 6,494,335 B1 * | 12/2002 | Kellogg | D06F 95/004 |
| | | | 220/9.3 |
| D472,752 S * | 4/2003 | Medendorp | D6/552 |
| D493,055 S * | 7/2004 | Ferretti | D6/552 |
| 6,805,225 B2 * | 10/2004 | Freedman | A45C 15/00 |
| | | | 220/495.05 |
| 6,877,231 B2 * | 4/2005 | Rosenberg | A47G 21/14 |
| | | | 248/37.3 |
| D504,770 S * | 5/2005 | Tobin | D3/226 |
| D507,145 S * | 7/2005 | Prata dos Santos | D6/629 |
| D513,364 S * | 1/2006 | Tobin | D3/221 |
| 7,004,378 B1 * | 2/2006 | Tharpe, Jr. | B65D 85/345 |
| | | | 229/174 |
| 7,267,238 B2 * | 9/2007 | Yang | A47J 47/20 |
| | | | 220/572 |
| 7,322,113 B2 * | 1/2008 | Tetreault | A47G 21/14 |
| | | | D7/637 |
| 7,322,466 B2 * | 1/2008 | Alonso | A47G 19/2255 |
| | | | 206/217 |
| D571,619 S * | 6/2008 | Abo | D7/637 |
| 7,802,688 B1 * | 9/2010 | Ruan | A47J 47/16 |
| | | | 248/37.3 |
| 7,938,262 B1 * | 5/2011 | Havive | B65D 7/20 |
| | | | 206/457 |
| 8,015,894 B2 * | 9/2011 | Hwang | F16H 25/22 |
| | | | 384/624 |
| 8,721,403 B2 * | 5/2014 | Welch | A47G 21/14 |
| | | | 206/553 |
| D742,078 S * | 10/2015 | Singh | D30/121 |
| D759,969 S * | 6/2016 | Lynch | D3/257 |
| D834,823 S * | 12/2018 | Cavazos, III | D3/313 |
| D949,639 S * | 4/2022 | Wei | D7/637 |
| D971,696 S * | 12/2022 | Yan | D7/637 |
| D986,690 S * | 5/2023 | Chen | D7/637 |
| 11,724,868 B2 * | 8/2023 | Amarello, Jr. | B65D 25/54 |
| | | | 206/315.9 |
| D1,005,795 S * | 11/2023 | Zhang | D7/637 |
| D1,028,410 S * | 5/2024 | Jiang | D34/21 |
| 2003/0098398 A1 * | 5/2003 | Tsuchida | A47J 47/16 |
| | | | 248/37.6 |
| 2003/0200960 A1 * | 10/2003 | Clark | F41A 9/83 |
| | | | 124/45 |
| 2004/0211737 A1 * | 10/2004 | Siegel | A47G 21/14 |
| | | | 248/37.3 |
| 2004/0238388 A1 * | 12/2004 | Snell | B65D 75/527 |
| | | | 206/315.9 |
| 2007/0017948 A1 * | 1/2007 | Smithson | A63B 47/021 |
| | | | 224/663 |
| 2008/0060205 A1 * | 3/2008 | Schmidt | A47G 21/14 |
| | | | 30/298.4 |
| 2011/0162217 A1 * | 7/2011 | Rabinovich | A47G 21/14 |
| | | | 30/298.4 |
| 2011/0168588 A1 * | 7/2011 | Guier | B65D 81/368 |
| | | | 206/315.9 |
| 2011/0262259 A1 * | 10/2011 | Zats | A63B 47/02 |
| | | | 280/30 |
| 2012/0324740 A1 * | 12/2012 | Brough | A47G 21/14 |
| | | | 30/298.4 |
| 2015/0257563 A1 * | 9/2015 | Ludeman | A47G 21/14 |
| | | | 29/428 |
| 2015/0321068 A1 * | 11/2015 | Chen | A63B 47/002 |
| | | | 206/315.9 |
| 2016/0346629 A1 * | 12/2016 | Chen | A63B 47/00 |
| 2018/0000268 A1 * | 1/2018 | Zhijian | G07C 9/00563 |
| 2018/0099195 A1 * | 4/2018 | Hopper | A63B 47/00 |
| 2019/0358512 A1 * | 11/2019 | Scott | A63B 43/02 |
| 2023/0127102 A1 * | 4/2023 | Sommerfeldt | A63B 63/08 |
| | | | 273/342 |
| 2023/0399152 A1 * | 12/2023 | Rice | B65D 43/12 |
| 2024/0108971 A1 * | 4/2024 | Tsao | A63F 5/007 |

* cited by examiner

KNIFE RACK

BACKGROUND OF THE INVENTION

1. Field of the Invention

The present invention relates to knife racks, in particular to a knife rack with good breathability and easy cleaning.

2. Description of the Related Art

A general knife rack is equipped with a plurality of slots of different sizes on a box for inserting and placing knives of various sizes. Although this type of knife rack can provide basic needs for placing knives, the inside of these slots is not easy to clean. After long-term use, it is easy for dirt or mold to accumulate, but since it is not easy to detect inside the slots, it is difficult for users to find it.

In order to improve this shortcoming, someone later proposed the method of arranging columnar objects in a box as a knife rack, for example, as disclosed in Japanese Patent Application Laid-Open No. 10-234497. The method of this case is to set an opening above a box so that the box has a space connected to the outside, and then put a plurality of columns in the space, and use these columns to serve as a support for knifes. The advantage of this approach is that the columns can be easily removed and cleaned, however, the disadvantage is that these columns will be in contact with the blades of the knives. especially when the blades of the knives contain moisture, these columns will stick to the blades due to moisture. As a result, the knives will be difficult to dry, and the blades will also be prone to leaving water marks after drying.

SUMMARY OF THE INVENTION

The main object of the present invention is to provide a knife rack with good breathability and easy cleaning.

To achieve the above object, the knife rack of the present invention comprises a box body having a bottom, a plurality of peripheral walls surrounding the bottom, an accommodating space surrounded by the peripheral walls and the bottom and an opening provided where the accommodating space communicates with the outside, a top cover covering the opening and provided with a plurality of long slotted holes, and a plurality of round balls set within the accommodating space of the box body.

The knife rack of the above structure of the present invention allows the knives to be inserted through the long slotted holes, and uses the round balls as a supporting structure to support the blades of the inserted knives. The gaps between round balls can be used as channels for air circulation and water evaporation.

Preferably, the bottom of the box body is provided with a plurality of through holes.

Preferably, the peripheral walls of the box body are provided with a plurality of ventilation holes.

DETAILED DESCRIPTION OF THE INVENTION

Figure 1:
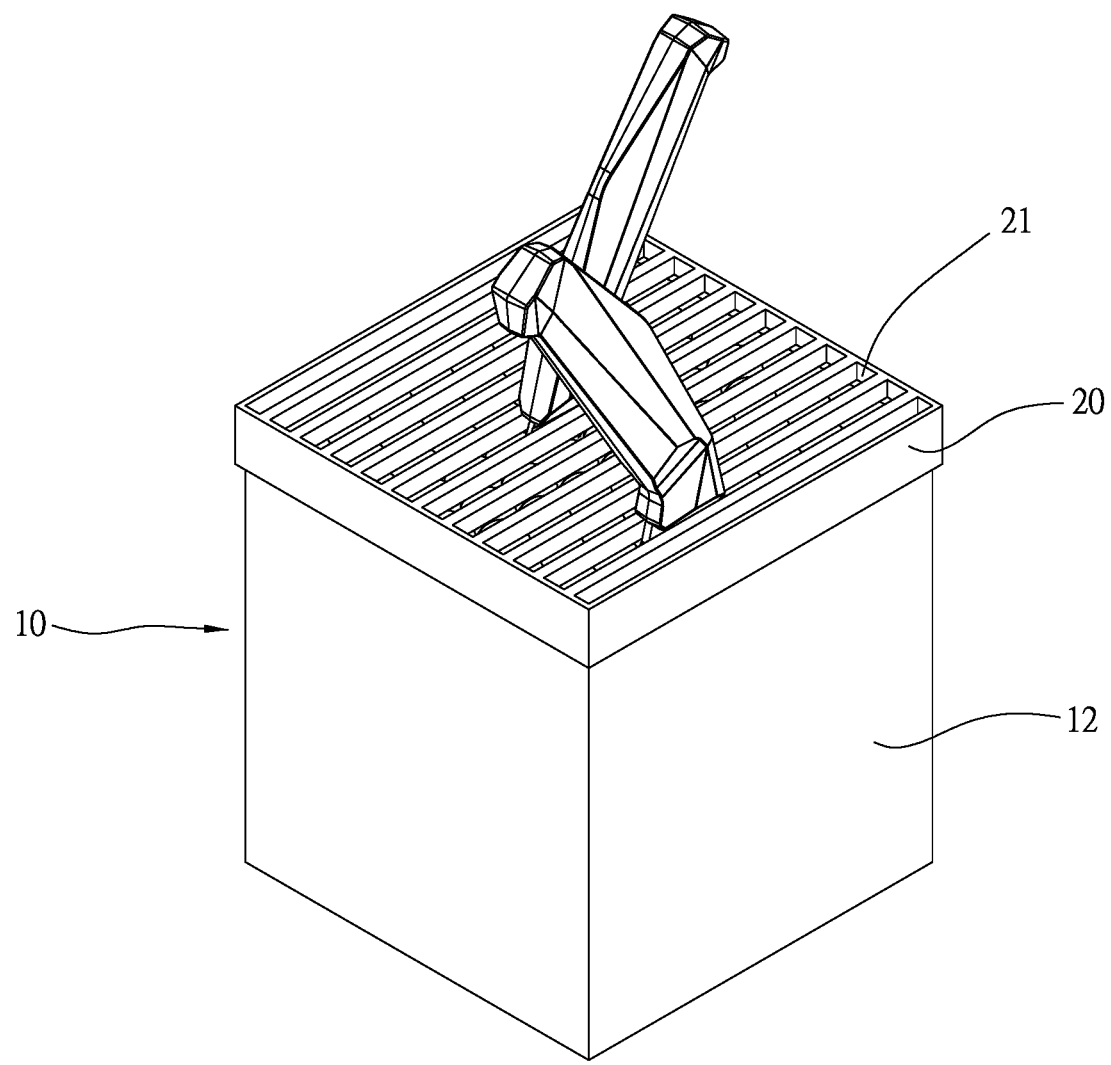
FIG. 1 is a schematic perspective view of the present invention.

The applicant first explains here that throughout the specification, including the embodiment described below and the claims in the scope of the patent application, the nouns related to directionality are based on the directions in the drawings. Secondly, in the preferred embodiment and drawings that will be introduced below, the same element numbers represent the same or similar elements or their structural features. The directions indicated in the instructions are based on the directions of the drawings for ease of explanation and are not limited thereto.

Figure 2:
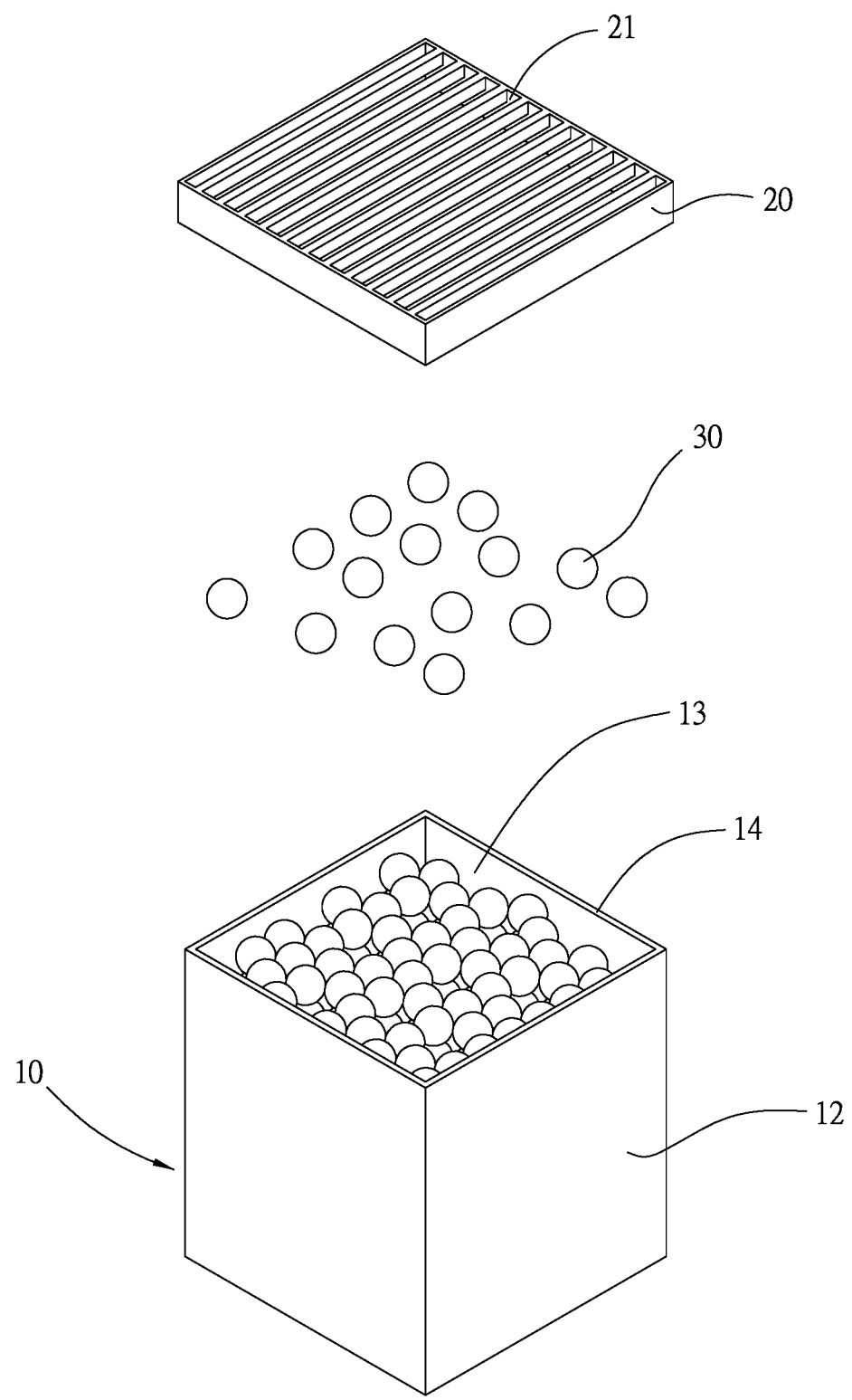
FIG. 2 is an exploded view of the present invention.
Figure 3:
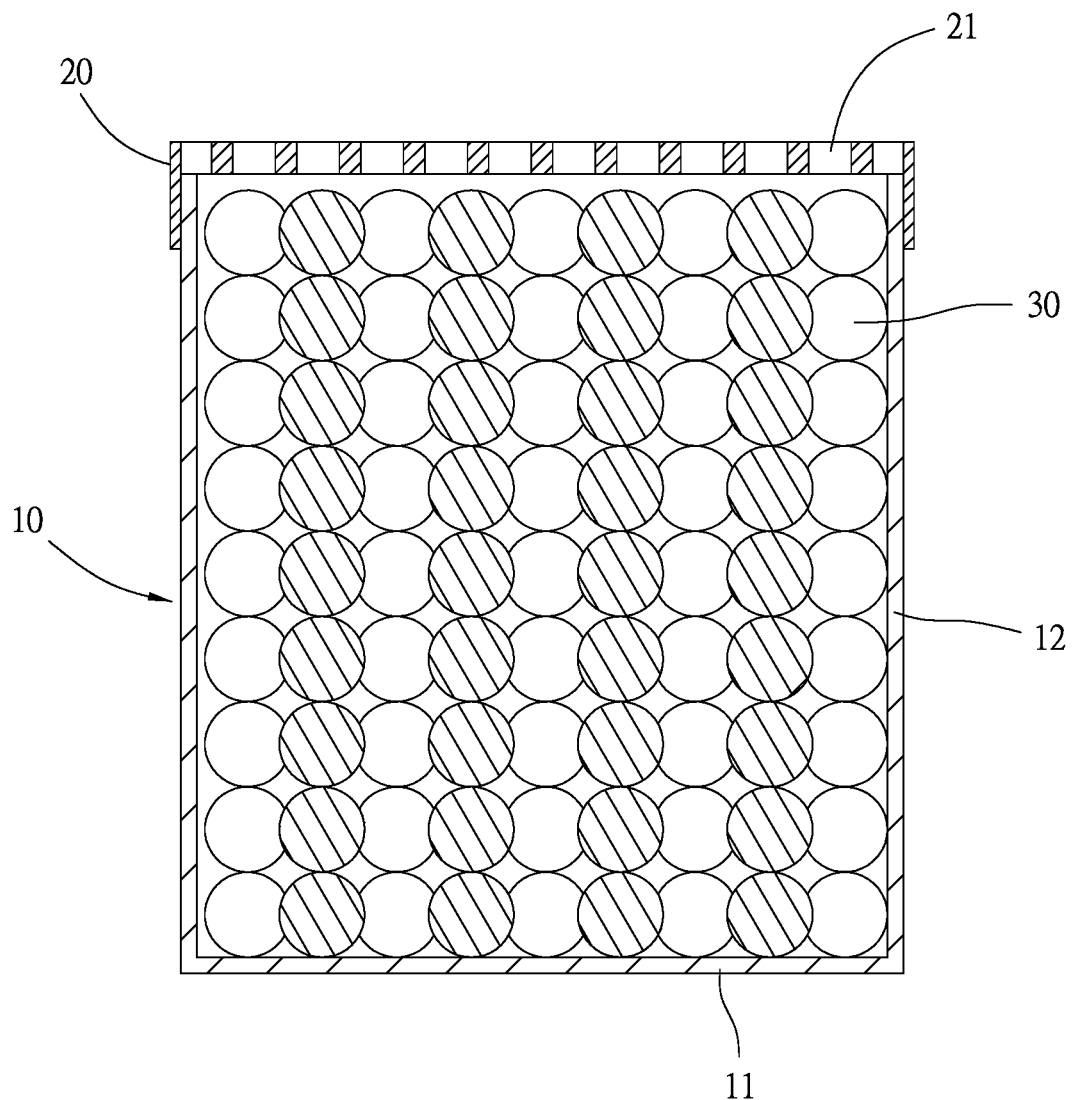
FIG. 3 is schematic cross-sectional view of the present invention.

Referring to FIGS. 1-3, the knife rack of the first embodiment of the present invention comprises: a box body 10, a top cover 20, and a plurality of round balls 30.

The shape of the box body 10 is not limited, it can be square, round or triangular, etc. In this embodiment, a rectangular box body is used as an illustration. The box body 10 comprises a bottom 11, a plurality of peripheral walls 12 surrounding the bottom 11, an accommodating space 13 surrounded by the peripheral walls 12 and the bottom 11, and an opening 14 is provided where the accommodating space 13 communicates with the outside.

The top cover 20 is provided on the opening 14, and the top cover 20 is provided with a plurality of long slotted holes 21, and the long slotted holes can allow the blades of knives to pass through respectively.

The round balls 30, of any material, are set within the accommodating space 13 of the box body. The volume occupied by the round balls 30 is preferably more than one-third of the volume of the accommodating space, because if there are too few round balls, the support effect will be poor. Moreover, the diameter of the round balls is preferably between 10 and 20 mm, because if the round balls 30 are too small, the gaps between them will be too small and dense, which is not conducive to the circulation of air. However, if the round balls 30 are too large, there will be too few round balls in contact with the blades, and the support effect on the blades will be poor, and the knives will not be easy to insert. The round balls 30 can be all of the same size or a mixed configuration of two or more round balls of different sizes. The width of the long slotted holes needs to be smaller than the minimum diameter of the round balls.

With the structure of the first embodiment of the present invention described above, knives can be inserted into the accommodating space 13 through the long slotted holes 21 of the top cover 20 when being stored, as shown in FIG. 1. Because the contact between the round balls 30 and the blade is not a surface contact or a linear contact but a point-like contact, the contact area between the round balls 30 and the blade can be greatly reduced. In addition, there are lots of gaps between round balls, so it is conducive to air circulation and water evaporation, which can effectively improve the shortcomings of previous products.

The structure of this invention is also very convenient for cleaning. You only need to remove the top cover 20 and then the round balls 30 can be taken out for cleaning. After washing and drying, put the round balls 30 back into the accommodating space 13 and cover it back up with the top cover 20.

Figure 4:
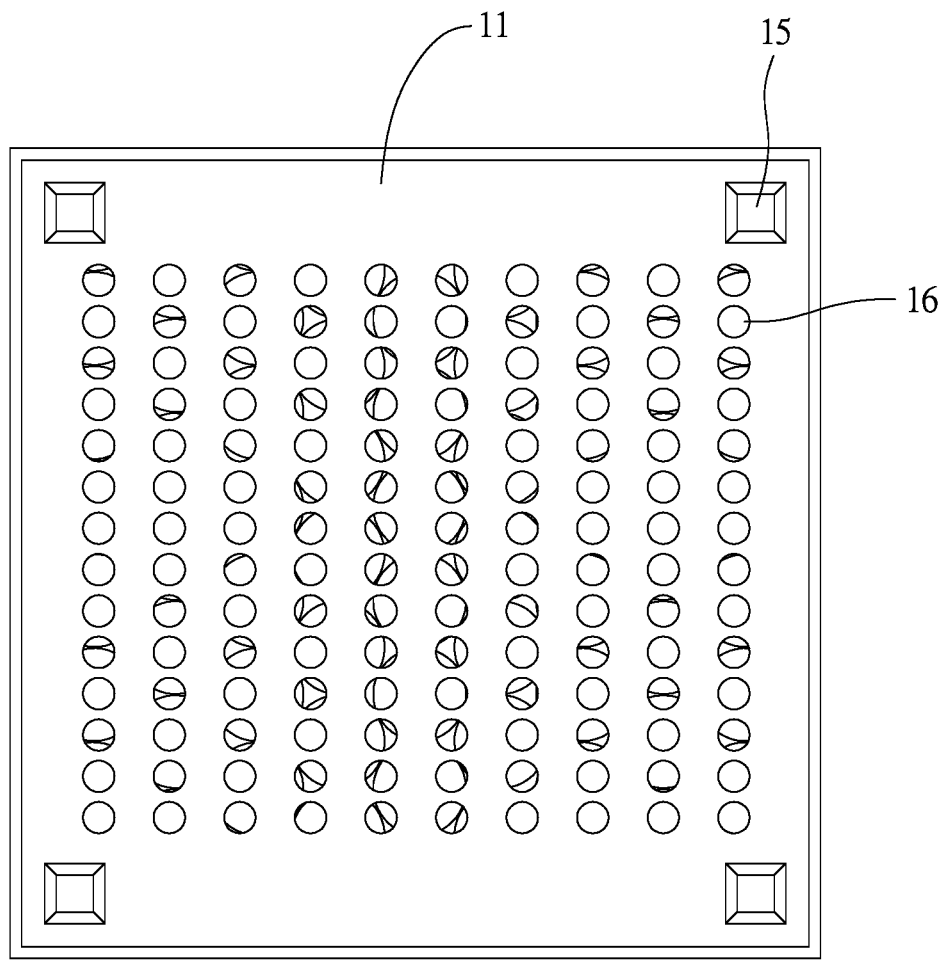
FIG. 4 is a schematic bottom view of the second embodiment of this invention.

In order to make the ventilation effect better, this invention can also set foot members 15 on the bottom 11 of the box body to raise the bottom 11, and a plurality of through holes 16 are provided on the bottom 11, as shown in the second embodiment of the present invention in FIG. 4, so that the through holes 16 can form air flow channels with the opening 14 above, which is more conducive to air circulation, and if there is water in the round balls 30 or the blade, the water can be drained out of the accommodating space 13 through the through holes 16 downwards. The shape of the through holes 16 is not limited, but the diameter of the through holes 16 needs to be smaller than the minimum diameter of the round balls 30 to prevent the round balls from protruding from the through holes.

Figure 5:
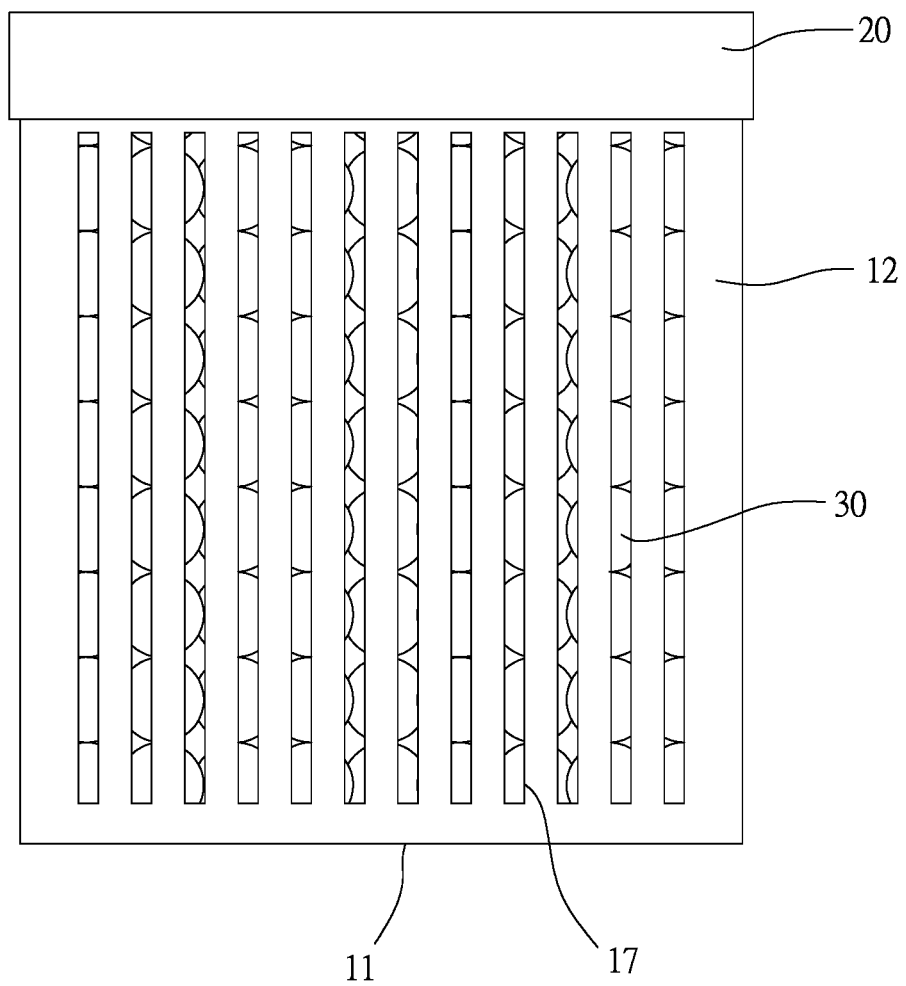
FIG. 5 is a schematic side view of the third embodiment of the present invention.

As shown in FIG. 5, the third embodiment of the present invention is shown. In addition to being provided with a plurality of through holes 16 on the bottom 11 of the box body 10 of the present invention, a plurality of ventilation holes 17 can be provided on the peripheral walls 12 of the box body. This can further increase the breathability of the accommodating space 13. The user can also directly see the internal conditions of the accommodating space 13 through the ventilation holes 17. If the round balls 30 are dirty, they can be easily detected.

In this embodiment, although the ventilation holes 17 are expressed in strip shapes, they are not limited to this. The width or size of the ventilation holes 17 must be smaller than the minimum diameter of the round balls 30 to prevent the round balls from protruding from the ventilation holes.

What is claimed is:

1. A knife rack for holding a knife, said knife has a blade and a handle, the knife rack, the knife rack comprising:
    a box body comprising a bottom, a plurality of peripheral walls that surround said bottom, an accommodating space surrounded by said peripheral walls and said bottom, and an opening at one side of said accommodating space, said accommodating space has a volume;
    a top cover on said opening, said top cover comprises a plurality of elongated slotted holes and each elongated slotted hole is configured to allow the blade of the knife to pass therethrough but the handle of the knife cannot pass therethrough; and
    a plurality of round balls within said accommodating space of said box body, each round ball has a volume and a diameter and an accumulative volume occupied by said plurality of round balls is more than one-third of the volume of said accommodating space.

2. The knife rack as claimed in claim 1, wherein said bottom of said box body comprises a plurality of through holes.

3. The knife rack as claimed in claim 2, wherein each through hole has a diameter and the diameter of each through hole is smaller than the diameter of each round ball.

4. The knife rack as claimed in claim 3, wherein said bottom of said box body comprises a plurality of foot members.

5. The knife rack as claimed in claim 1, wherein said peripheral walls of said box body comprises a plurality of ventilation holes and each ventilation hole has a width.

6. The knife rack as claimed in claim 5, the width of each ventilation holes is less than the diameter of each round ball.

7. The knife rack as claimed in claim 2, wherein said peripheral walls of said box body comprise a plurality of ventilation holes.

8. The knife rack as claimed in claim 5, wherein the width of each ventilation hole is less than the diameter of each round ball.

9. The knife rack as claimed in claim 1, wherein the diameter of each round ball is preferably between 10~20 mm.

10. The knife rack as claimed in claim 2, wherein the diameter of each round ball is preferably between 10~20 mm.

11. The knife rack as claimed in claim 5, wherein the diameter of each round ball is preferably between 10~20 mm.

* * * * *